(12) United States Patent
Van Doren et al.

(10) Patent No.: US 7,149,852 B2
(45) Date of Patent: Dec. 12, 2006

(54) SYSTEM AND METHOD FOR BLOCKING DATA RESPONSES

(75) Inventors: Stephen R. Van Doren, Northborough, MA (US); Gregory Edward Tierney, Chelmsford, MA (US); Simon C. Steely, Jr., Hudson, NH (US)

(73) Assignee: Hewlett Packard Development Company, LP., Houston, TX (US)

( * ) Notice: Subject to any disclaimer, the term of this patent is extended or adjusted under 35 U.S.C. 154(b) by 484 days.

(21) Appl. No.: 10/761,034

(22) Filed: Jan. 20, 2004

(65) Prior Publication Data

US 2005/0160240 A1     Jul. 21, 2005

(51) Int. Cl.
*G06F 12/00* (2006.01)
(52) U.S. Cl. .................. 711/141; 711/143; 711/146
(58) Field of Classification Search .............. None
See application file for complete search history.

(56) References Cited

U.S. PATENT DOCUMENTS

| | | | |
|---|---|---|---|
| 5,802,577 A | 9/1998 | Bhat et al. | |
| 5,829,040 A | 10/1998 | Son | |
| 5,875,467 A | 2/1999 | Merchant | |
| 5,875,472 A | 2/1999 | Bauman et al. | |
| 5,958,019 A | 9/1999 | Hagersten et al. | |
| 6,055,605 A | 4/2000 | Sharma et al. | |
| 6,085,263 A | 7/2000 | Sharma et al. | |
| 6,108,737 A | 8/2000 | Sharma et al. | |
| 6,345,342 B1 | 2/2002 | Arimilli et al. | |
| 6,457,100 B1 | 9/2002 | Ignatowski et al. | |
| 6,490,661 B1 | 12/2002 | Keller et al. | |
| 6,631,401 B1 | 10/2003 | Keller et al. | |
| 2001/0034815 A1 | 10/2001 | Dungan et al. | |
| 2002/0009095 A1 | 1/2002 | Van Doren et al. | |
| 2002/0073071 A1 | 6/2002 | Pong et al. | |
| 2003/0018739 A1 | 1/2003 | Cypher et al. | |
| 2003/0140200 A1 | 7/2003 | Jamil et al. | |
| 2003/0145136 A1 | 7/2003 | Tierney et al. | |
| 2003/0195939 A1 | 10/2003 | Edirisooriya et al. | |
| 2003/0200397 A1 | 10/2003 | McAllister et al. | |
| 2004/0123052 A1* | 6/2004 | Beers et al. ............... | 711/150 |
| 2005/0013294 A1* | 1/2005 | Cypher ................... | 370/389 |
| 2005/0053057 A1* | 3/2005 | Deneroff et al. .......... | 370/360 |

OTHER PUBLICATIONS

Scheurich et al., "The design of a lockup-free cache for high-performance multiprocessors", Nov. 14-18, 1988 Supercomputing '88. [vol. 1]. Proceedings.pp. 352-359.*

Laudon et al., "The SGI Origin: a ccNUMA highly scalable server", 1997 International Conference on Computer Architecture pp. 241-251.*

Handy, "The Cache Memory Book", 1998, Academic Press 2nd ed, pp. 144-155.*

Rajeev, Joshi, et al., "Checking Cache-Coherence Protocols with TLA+", Kluwer Academic Publishers, 2003, pp. 1-8.

(Continued)

*Primary Examiner*—Mano Padmanabhan
*Assistant Examiner*—Paul Baker

(57) ABSTRACT

Systems and methods are disclosed for blocking data responses. One system includes a target node that, in response to a source broadcast request for requested data, provides a response that includes a copy of the requested data. The target node also provides a blocking message to a home node associated with the requested data. The blocking message being operative cause the home node to provide a non-data response to the source broadcast request if the blocking message is matched with the source broadcast request at the home node.

34 Claims, 5 Drawing Sheets

OTHER PUBLICATIONS

Martin, Milo M.K., et al., "Token Coherence: Decoupling Performance and Correctness", ISCA-30, pp. 1-12, Jun. 9-11, 2003.

Acacio, Manuel E., et al., "Owner Prediction for Accelerating Cache-to-Cache Transfer Misses in a cc-NUMA Architecture", IEEE 2002.

Gharachorloo, Kourosh, et al., "Architecture and Design of AlphaServer GS320", Western Research Laboratory, date unknown.

Gharachorloo, Kourosh, et al., "Memory Consistency and Event Ordering In Scalable Shared-Memory Multiprocessors", Computer Systems Laboratory, pp. 1-14, date unknown.

* cited by examiner

SYSTEM AND METHOD FOR BLOCKING DATA RESPONSES

RELATED APPLICATIONS

This application is related to the following commonly assigned co-pending patent applications entitled:

"CACHE COHERENCY PROTOCOL WITH ORDERING POINTS," Ser. No. 10/760,640; "SYSTEM AND METHOD FOR RESOLVING TRANSACTIONS IN A CACHE COHERENCY PROTOCOL," Ser. No. 10/760, 813; "SYSTEM AND METHOD TO FACILITATE ORDERING POINT MIGRATION," Ser. No. 10/761,048; "SYSTEM AND METHOD TO FACILITATE ORDERING POINT MIGRATION TO MEMORY," Ser. No. 10/760,599; "SYSTEM AND METHOD FOR CREATING ORDERING POINTS," Ser. No. 10/760,652; "SYSTEM AND METHOD FOR CONFLICT RESPONSES IN A CACHE COHERENCY PROTOCOL WITH ORDERING POINT MIGRATION," Ser. No. 10/760,651; "SYSTEM AND METHOD FOR READ MIGRATORY OPTIMIZATION IN A CACHE COHERENCY PROTOCOL," Ser. No. 10/761,044; "SYSTEM AND METHOD FOR NON-MIGRATORY REQUESTS IN A CACHE COHERENCY PROTOCOL," Ser. No. 10/760,659; "SYSTEM AND METHOD FOR CONFLICT RESPONSES IN A CACHE COHERENCY PROTOCOL WITH ORDERING POINT MIGRATION," Ser. No. 10/761,073; "SYSTEM AND METHOD FOR CONFLICT RESPONSES IN A CACHE COHERENCY PROTOCOL," Ser. No. 10/761,047; "SYSTEM AND METHOD FOR RESPONSES BETWEEN DIFFERENT CACHE COHERENCY PROTOCOLS," Ser. No. 10/760, 436; all of which are filed contemporaneously herewith and are incorporated herein by reference.

BACKGROUND

Multi-processor systems employ two or more computer processors that can communicate with each other, such as over a bus or a general interconnect network. In such systems, each processor may have its own memory cache (or cache store) that is separate from the main system memory that the individual processors can access. Cache memory connected to each processor of the computer system can often enable faster access to data than if accessed from the main system memory. Caches are useful because they tend to reduce latency associated with accessing data on cache hits, and they work to reduce the number of requests to system memory. In particular, a write-back cache enables a processor to write changes to data in the cache without simultaneously updating the contents of memory. Modified data can be written back to memory at a later time.

Coherency protocols have been developed to ensure that whenever a processor reads a memory location the processor receives the correct or true data. Additionally, coherency protocols help ensure that the system state remains deterministic by providing rules to enable only one processor to modify any part of the data at any one time. If proper coherency protocols are not implemented, however, inconsistent copies of data can be generated.

There are two main types of cache coherency protocols, namely, a directory-based coherency protocol and a broadcast-based coherency protocol. A directory-based coherency protocol associates tags with each memory line. The tags can contain state information that indicates the ownership or usage of the memory line. The state information provides a means to track how a memory line is shared. Examples of the usage information can be whether the memory line is cached exclusively in a particular processor's cache, whether the memory line is shared by a number of processors, or whether the memory line is currently cached by any processor.

A broadcast-based coherency protocol employs no tags. Instead, in a broadcast-based coherency protocol, each of the caches monitors (or snoops) requests to the system. The other caches respond by indicating whether a copy of requested the data is stored in the respective caches. Thus, correct ownership and usage of the data are determined by the collective responses to the snoops. One type of broadcast-based protocol returns data from both cache and the memory. Another type of broadcast-based protocol returns data from cache, but from memory if the data is not returned from cache.

SUMMARY

One embodiment of the present invention may comprise a system that includes a target node that, in response to a source broadcast request for requested data, provides a response that includes a copy of the requested data. The target node also provides a blocking message to a home node associated with the requested data. The blocking message being operative cause the home node to provide a non-data response to the source broadcast request if the blocking message is matched with the source broadcast request at the home node.

Another embodiment of the present invention may comprise a computer system that includes a source processor that issues a source broadcast request for data. An owner processor has an associated cache that includes the data in a given cache line. The owner processor provides a response to the source processor that includes the data. The owner processor also providing a blocking message to a home node associated with the data. The home node provides a memory data response to the source broadcast request if no blocking message is matched with a transaction for the data at the home node. The home node provides a non-data response to the source broadcast request if the blocking message is matched with the transaction for the data at the home node.

Another embodiment of the present invention may comprise a method that includes providing a data response from an owner processor node to a source broadcast request for requested data. One of a non-data response and a data response is selectively provided from a home node to the source broadcast request based on a blocking message being matched with a transaction associated with the source broadcast request at the home node.

DETAILED DESCRIPTION

This disclosure relates generally to a broadcast-based coherency protocol that mitigates providing redundant data responses from memory. A processor can provide a blocking message to a home node in conjunction with the processor responding to a request with a copy of the requested data. The home node will return either a non-data response or a data response depending on the arrival of the blocking message at the home node. As used herein, "non-data response" refers to a type of response that does not include a copy of the requested data, which is a lower bandwidth response that the data response. The data response includes a copy of the requested data. When the blocking message causes the home node to provide the non-data response instead of a data response, the system implementing such protocol affords improved interconnect bandwidth since duplicated data responses can be avoided when data is returned from cache of another processor. The benefits associated with the blocking message can be considered opportunistic since the blocking message is not required for the system to operate successfully.

Figure 1:
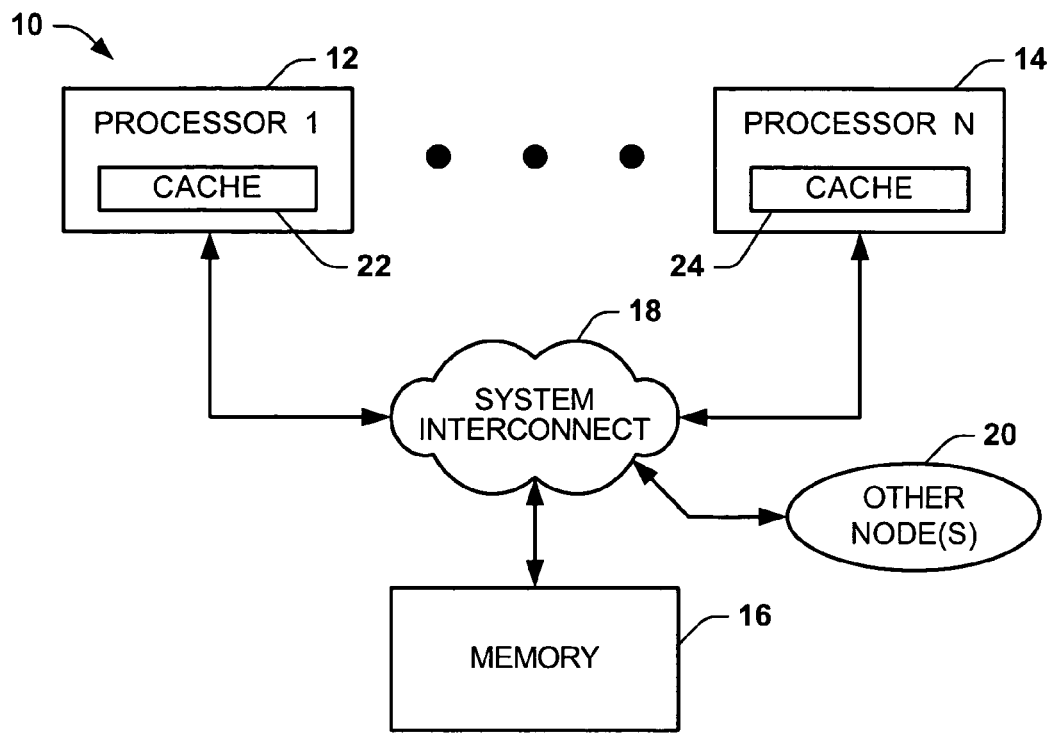
FIG. 1 depicts an example of a multi-processor system.

FIG. 1 depicts an example of a system 10 that mitigates redundant or stale data being returned from memory if also being provided from cache. The system 10 includes a plurality of processors 12 and 14 (indicated at PROCESSOR 1 through PROCESSOR N, where N is a positive integer (N☐1)). The system 10 also includes memory 16 that provides a shared address space for the system. The memory 16, for example, can be a globally accessible aggregate memory, such as can be implemented as one or more memory nodes. The memory 16 can include one or more memory storage devices (e.g., dynamic random access memory (DRAM)) and a memory controller for managing access to the storage devices.

The processors 12 and 14 and memory 16 define nodes in the system 10 that can communicate with each other via a system interconnect 18. For example, the system interconnect 18 can be implemented as a switch fabric or a hierarchical switch. Also associated with the system 10 can be one or more other nodes, indicated schematically at 20. The other nodes 20 can correspond to one or more additional processors or other multi processor systems (e.g., one or more symmetric multi-processor (SMP) nodes) connected to the system interconnect 18, such as through an appropriate interconnect interface (not shown).

Each of the processors 12, 14 includes at least one corresponding cache 22 and 24, respectively. For purposes of brevity, each of the respective caches 22 and 24 is depicted as unitary memory structures, although each may comprise a plurality of memory devices or different cache levels. Each of the caches 22 and 24 includes a plurality of cache lines. Each cache line has an associated tag address that identifies corresponding data stored in the line. The system 10 employs the caches 22 and 24 and the memory 16 to store blocks of data, referred to as "memory blocks." A memory block can occupy part of a memory line, an entire memory line or span across multiple lines. For purposes of simplicity of explanation, however, it will be assumed that a "memory block" occupies a single "memory line" in memory or a "cache line" in a cache.

Each cache line can also include information identifying the state of the data stored in the respective cache. A given memory block can be stored in a cache line of one or more of the caches 22 and 24 as well as in a memory line of the memory 16, depending on the state of the line. Whether a cache line contains a coherent copy of the data also depends on the state of the cache line. Certain states employed by the coherency protocol can define a given cache line as an ordering point for the system 10. An ordering point characterizes a serialization of requests to the same memory line (or memory block) that is understood and followed by the system 10.

The system 10 implements a cache coherency protocol to manage the sharing of memory blocks so as to ensure coherence of data. The coherency protocol establishes rules for transitioning between states, such as if data is read from or written to the memory 16 or one of the caches 22 and 24. For example, the system 10 can implement a broadcast-based protocol. Alternatively, the system 10 can employ a hybrid protocol employing both a broadcast-based protocol and a forward progress protocol, such as a null-directory or directory-based protocol.

As used herein, a node that issues a request, such as a read or write request, defines a source node or source processor. Other nodes within the system 10 are potential targets of the request. Additionally, each memory block in the system 10 can be assigned a "home node" that maintains necessary global information and a data value for that memory block. The home node can be implemented in the memory 16, which defines a shared memory space for the system 10.

For example, in a null-directory-based protocol, the memory 16 can operate as the home node. The memory 16 receives a request from a source node and then snoops the system 10 for a coherent copy of the requested data. Alternatively, in a directory based protocol, the memory includes a directory (not shown) that includes information identifying where in the system 10 a coherent copy of the data should be located for each memory block. While a single memory 16 is depicted in FIG. 1, any number of one or more memory structures could be utilized.

The protocol implemented by the system 10 for processing a given request sets the available states and possible state transitions at each respective node 12, 14, 16, 20. Additionally, the type of response and whether a response will be provided depends upon the type of request, as well as the state of the identified memory block contained in the responding nodes. A set of cache states that can be implemented by the system 10 for a respective cache line is depicted below in Table 1. Since there are seven possible states, the state information can be encoded by a three-bit data word, for example.

TABLE 1

| STATE | DESCRIPTION |
| --- | --- |
| I | Invalid—The cache line does not exist. |
| S | Shared—The cache line is valid and unmodified by caching processor. Other processors may have valid copies, and the caching processor cannot respond to snoops by returning data. |
| E | Exclusive—The cache line is valid and unmodified by caching processor. The caching processor has the only cached copy in the system and may respond to snoops by returning data. |
| F | First (among equals)—The cache line is valid and unmodified by caching processor. Other processors may have valid copies, and caching processor may respond to snoops by returning data. |
| D | Dirty—The cache line is valid and more up-to-date than memory. The cache line has not been modified by the caching processor, and the caching processor has the only cached copy in the system. The caching processor must respond to snoops by returning data and must write data back to memory upon displacement. The dirty state permits a modified block to be transferred between caches without updating memory. |
| M | Modified—The cache line is valid and has been modified by the caching processor. The caching processor has the only cached copy in the system, and the caching processor must respond to |

TABLE 1-continued

| STATE | DESCRIPTION |
|---|---|
| | snoops by returning data and must write data back to memory upon displacement. |
| O | Owned—The cache line is valid and more up-to-date than memory. The caching processor may have modified the cache line. Other processors may have valid copies, and the caching processor must respond to snoops by returning data and must write data back to memory upon displacement. |

As mentioned above, the state of a cache line can be utilized to define a cache ordering point in the system 10. In particular, for a protocol implementing the states set forth in Table 1, a cache line having one of the states M, O, E, F or D can serve as an ordering point for the data contained in that cache line. A processor 12, 14 that serves as the cache ordering point corresponds to an owner node capable of responding with data to snoops for the data. For example, the processor can provide a shared copy of the data, which may be stored in another cache, or it can be a unique or dirty version of the data. The type of data returned by an owner processor depends on the state of the data stored in the processor's cache. The response may also vary based on the type of request. The memory 16 seeks to return a copy of the data stored in the memory. The memory copy of the data is not always a coherent copy and may be stale.

If a processor 12, 14 (e.g., as an owner node) provides a response to a requester that includes a copy of requested data, the processor also provides a blocking message to the memory 16. The blocking message is associated with the request from the requester, such as through a tag or identifier in the blocking message. The memory 16 provides a corresponding response to the requester, either including data or not including data, based on the blocking message.

By way of example, assume that the processor 12 (a source node) requires a copy of data associated with a particular memory address, and assume that the data is unavailable from its own local cache 22. Since the processor 12 does not contain a copy of the requested data, the processor may be initially in the I-state (invalid) for that data or it may contain a different line altogether. For purposes of simplicity of explanation, the starting state for this and other examples is the I-state. The processor 12, operating as the source node, transmits a source broadcast request to the other processor 14, the memory 16 and the other nodes 20 via the system interconnect 18.

Assuming a cache hit at the processor 14, the processor 14 provides a response to the processor 12 that includes a copy of the requested data. The response can include a shared copy or a dirty copy of the data, generally depending on the type of request and the state of the cache line containing the requested data. The processor 14 also provides a blocking message to the memory 16. The blocking message, for example, includes an identifier or tag associated with the original request provided by the requesting processor 12. The identifier enables the memory 16 to match the blocking message with a corresponding request or transaction being processed for memory access. The blocking message forces the memory 16 to return a non-data acknowledgment response (e.g., a low bandwidth response) when any blocking message (from the processor 14 or any other processor) matches a pending transaction in the memory.

The blocking message can afford improved interconnect bandwidth when a cache to cache hit occurs since the memory can return a lower bandwidth acknowledgement response in place of a higher bandwidth memory data response. Additionally, improved memory bandwidth can exist in situations when the memory 16 can match the blocking message with a transaction before performing a corresponding memory access. Regardless of the frequency that the beneficial effects occur, the net effects are opportunistic since they are not required to maintain forward progress for processing transactions in the system 10. The opportunistic feature arises because the requesting processor 12 employs a state machine or other mechanism to resolve when more than one data response is received for a source broadcast transaction.

By way of further example, the home node marks a transaction for providing a non-data response based on when the blocking message is received at the home node. If the home node receives the blocking message while a request is queuing or processing at the home node (e.g., the memory 16), for example, the blocking message can be matched to the request. After matching the blocking message with the transaction, the home node can provide a non-data response back to the requester. If no blocking message is received during the period of time associated with queuing or processing the transaction, the node returns a memory data response to the requester and the blocking message can be discarded. Assuming no competing blocking messages, the blocking message from the processor 14 may not match a transaction at the memory 16, such that a corresponding memory data response will be provided in two general cases: (1) when the blocking message arrives before the request at the memory; and (2) when the blocking message arrives after the matching transaction had already responded to the requesting processor 12.

It is possible that a data response is not received by the requesting processor 12 while employing the broadcast-based protocol. If the requesting processor does not receive data, the processor can retry the request by employing a forward progress technique. For example, if the requester fails to receive a data response, the requester can transition to a forward progress cache coherency protocol, such as a null-directory or directory-based protocol. The system 10 thus can implement a hybrid cache coherency protocol that includes a primary broadcast-based protocol and a secondary directory-based or null-directory cache coherency protocol. The secondary protocol can be employed to reissue and process requests, such as when data is not returned to the requester as well as in conflict situations. Those skilled in the art will appreciate various forward progress cache coherency protocols could be utilized as the secondary protocol by the system 10.

Figure 2:
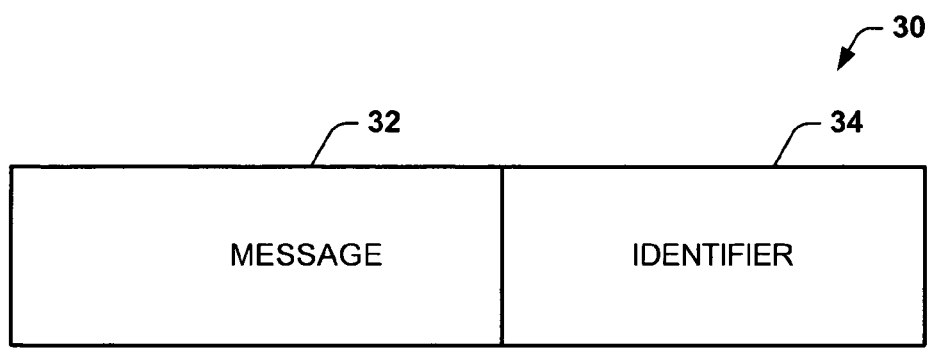
FIG. 2 depicts an example of a packet for a blocking message.

FIG. 2 depicts an example of a packet 30 for a blocking message. The packet 30 includes a message portion 32 and an identifier 34. The message portion 32, for example, identifies the packet 30 at a home node as a blocking message associated with a cache-to-cache hit. The packet 30 thus indicates that data, which is at least as up-to-date as memory is being returned to a requester. The memory is responsive to the packet 30; namely, the packet can force the home node to return a non-data response to a source node instead of a full data response.

The identifier 34 of the packet 30 identifies a transaction associated with the packet, such as the request that triggered the owner node to send the packet 30. The identifier 34, for example, can be tagged with identification data sufficient to enable the home node to match the packet 30 with a pending transaction at the home node. The extent or specificity of the identifier 34 can vary. For example, the identifier 34 can include a tag address associated with the data being requested to enable the home node to perform a look-up for matching the packet 30 with a transaction in the home node. Alternatively, the identifier 34 can identify an entry in a miss address file (MAF), such as by a MAF ID, allocated by the requester for the requested data (e.g., a transaction). As another example, the identifier 34 can include a plurality of references associated with the requester and/or the requested data. The identifier 34 thus can include any information or a combination of information based on which a home node can opportunistically match the packet 30 with a pending transaction or response.

Figure 3:
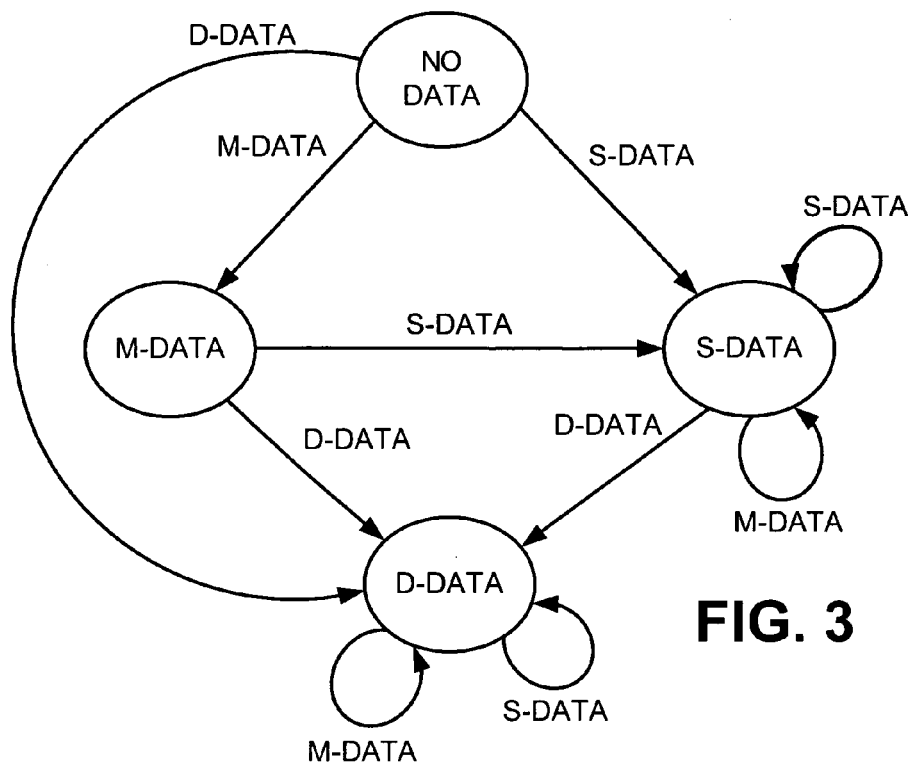
FIG. 3 depicts an example of a state diagram for a MAF.

As mentioned above, since a data response from a home node can vary based on the arrival of a blocking signal, it is possible for the requester to receive more than one copy of the requested data. Accordingly, the requester can employ a state machine to manage filling data in the cache of the requester. FIG. 3 depicts an example of a state diagram that represents operation of a data state machine that can be utilized to manage data returned to a requester. The example of FIG. 3 assumes three types of data that can be returned to a requester. These three types of data include shared (S) data, dirty (D) data and memory (M) data.

A processor can provide an ownership data response that includes D-data, for example, when the processor has an ownership state (e.g., M, O, E, F or D) associated with the cached data. It is the state of the cached data that defines the processor as a cache ordering point for the data. When a processor responds with D-data, the ordering point is transferred to the requesting processor. S-data is a shared data response that indicates data is being returned from a cached ordering point, although the ordering point itself is not being transferred to the requester. A shared data response also indicates that a copy of the data may be in one or more other caches. An M-data response can be provided by memory (e.g., a home node) by returning the present value for the data stored in memory. It is possible that the M-data is stale and not up-to-date.

As shown in the state diagram of FIG. 3, D-data overrides both M-data and S-data, meaning that D-data will result in a cache fill, overwriting M-data or S-data that is received prior to the D-data. Additionally, S-data will overwrite M-data, but not D-data. Thus, D-data has priority over M-data and S-data, and S-data has priority over M-data. M-data results in a cache fill only if no other types of data have been received. If a lower priority data is received at a requester, the requester can drop the subsequent, lower priority data.

Figure 4:
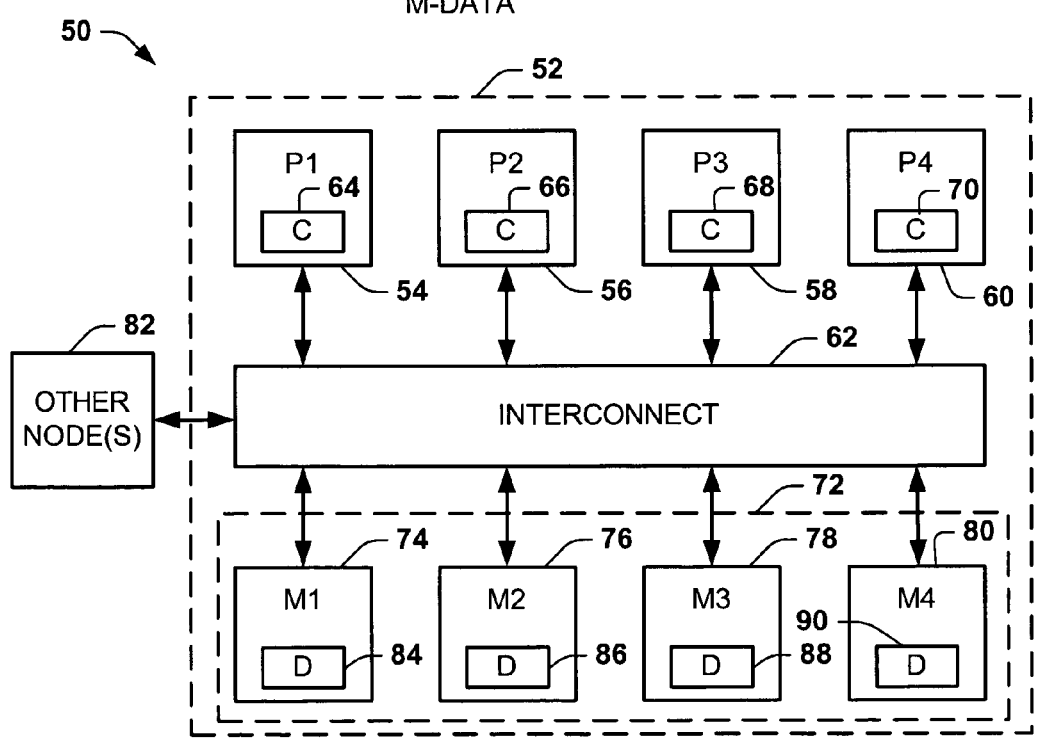
FIG. 4 depicts an example of another multi-processor system.

FIG. 4 depicts an example of a multi-processor computing system 50. The system 50, for example, includes an SMP node 52 that includes processors (P1, P2, P3, P4) 54, 56, 58 and 60 in communication with each other via an interconnect 62. The interconnect 62 facilitates transferring data between processors and memory of the system 50. While four processors 54, 56, 58 and 60 are depicted in the example of FIG. 4, those skilled in the art will appreciate that a greater or smaller number of processors can be implemented in the node 52.

Each processor 54, 56, 58 and 60 also includes an associated cache 64, 66, 68 and 70. The caches 64, 66, 68 and 70 can enable faster access to data than from an associated main memory 72 of the node 52. The system 50 implements a cache coherency protocol designed to ensure coherency of data in the system. By way of example, the cache coherency protocol includes a source broadcast protocol in which broadcast snoops or requests for data are transmitted directly from a source processor (or requester) to all other processors and memory in the system 50. The protocol can further be implemented as a hybrid protocol that includes a source broadcast protocol in conjunction with another forward progress protocol, such as a null-directory or directory-based protocol. The system 50 of FIG. 4, for example, initially employs the source broadcast protocol to issue source broadcast snoop requests for desired data from a source node. If the request cannot be processed using the source broadcast protocol, such as when a conflict exists or the request otherwise fails, the system 50 transfers to its forward progress protocol and the source node reissues a corresponding request using such protocol.

The memory 72 can include multiple memory modules (M1, M2, M3, M4) 74, 76, 78 and 80. The memory 72 can be organized as a single address space that is shared by the processors 54, 56, 58 and 60 as well as other nodes 82 of the system 50. Each of the memory modules 74, 76, 78 and 80 can include a corresponding directory 84, 86, 88 and 90 that defines how the memory blocks are apportioned in each respective module as well as where the corresponding coherent copy of the data should reside in the system 50. Alternatively, the memory modules may contain no directories. A coherent copy of data, for example, may reside in a home node (e.g., associated with a given memory module) or, alternatively, in a cache of one of the processors 54, 56, 58 and 60.

The other node(s) 82 can include one or more other SMP nodes associated with the SMP node 52 via the interconnect 62. For example, the interconnect 62 can be implemented as a switch fabric or hierarchical switch programmed and/or configured to manage transferring requests and responses between the processors 54, 56, 58 and 60 and the memory 70, as well as those to and from the other nodes 82.

When a processor 56 requires desired data, the processor 56 operates as a source node and issues a source broadcast snoop (e.g., a broadcast read or write request). The broadcast snoop is provided to the system 50 via the interconnect 62, including to all other processors 54, 58 and 60, to the other nodes 82 as well as to the memory 72 (or at least a home memory module 74, 76, 78 and 80 thereof). The processor 56 receives a corresponding response from another processor 60. The processor 60 can provide a response that includes a copy of the requested data when the processor serves as a cache ordering point for the requested data. The processor 60 can serve as a cache ordering point when the processor contains the requested data in a cache line having a state (e.g., M, O, E, F or D) that defines the processor as the cache ordering point for such data. As an ordering point, the processor 60 can provide S-data or D-data when a cache hit occurs.

In conjunction with providing the data response to the requesting processor 56, the processor 60 also provides a blocking message to the home node associated with the data, for example, in memory module 78 of the shared memory 72. The blocking message includes information (e.g., an identifier) based on which the home node can match the message with a pending transaction in the home node. If any blocking message (including the blocking message from the processor 60) is matched to a pending transaction at the home node, the home node provides a non-data acknowledgement response, such as a MISS response. A blocking message can find a match, for example, if the message arrives at the home memory module 78 while the source broadcast request is queued for memory access or while the memory module is accessing the requested data to service the request. When no blocking message matches with a transaction or response at the home node (e.g., no blocking message is received while the home node is queuing or processing a corresponding transaction), the home node provides a memory data response that includes a memory copy (e.g., M-data) of the requested data.

The source processor 56 receives responses from the processors 54, 58 and 60, the memory module 78 and the other nodes. The other processors 54 and 58 respond to the broadcast request issued by the processor 56, such as with MISS responses or non-data shared responses. A MISS response can be provided by a target node that does not contain a valid cache line for the requested data or if the target contained a valid cache line, but was invalidated at the target prior to receiving the broadcast snoop request from the processor 56. A shared response is a non-data response that indicates that the responding processor includes a shared copy of the requested data, but cannot respond with data. The processor 56 fills the cache 66 with data based on the command type of the data responses received in response to the request.

When the blocking message results in the memory module 78 (e.g., home node) returning a non-data response to the source processor 56, bandwidth resources are conserved because a higher bandwidth data response is not returned by the home node over the interconnect 62. Additionally, if the memory module 78 can match the blocking message with the request before performing a memory access, memory bandwidth can be reduced since the memory access can be omitted. The perceived latency associated with returning the non-data response may also be reduced since the memory module 78 can provide the non-data response without having to perform a generally high latency memory access.

Figure 5:
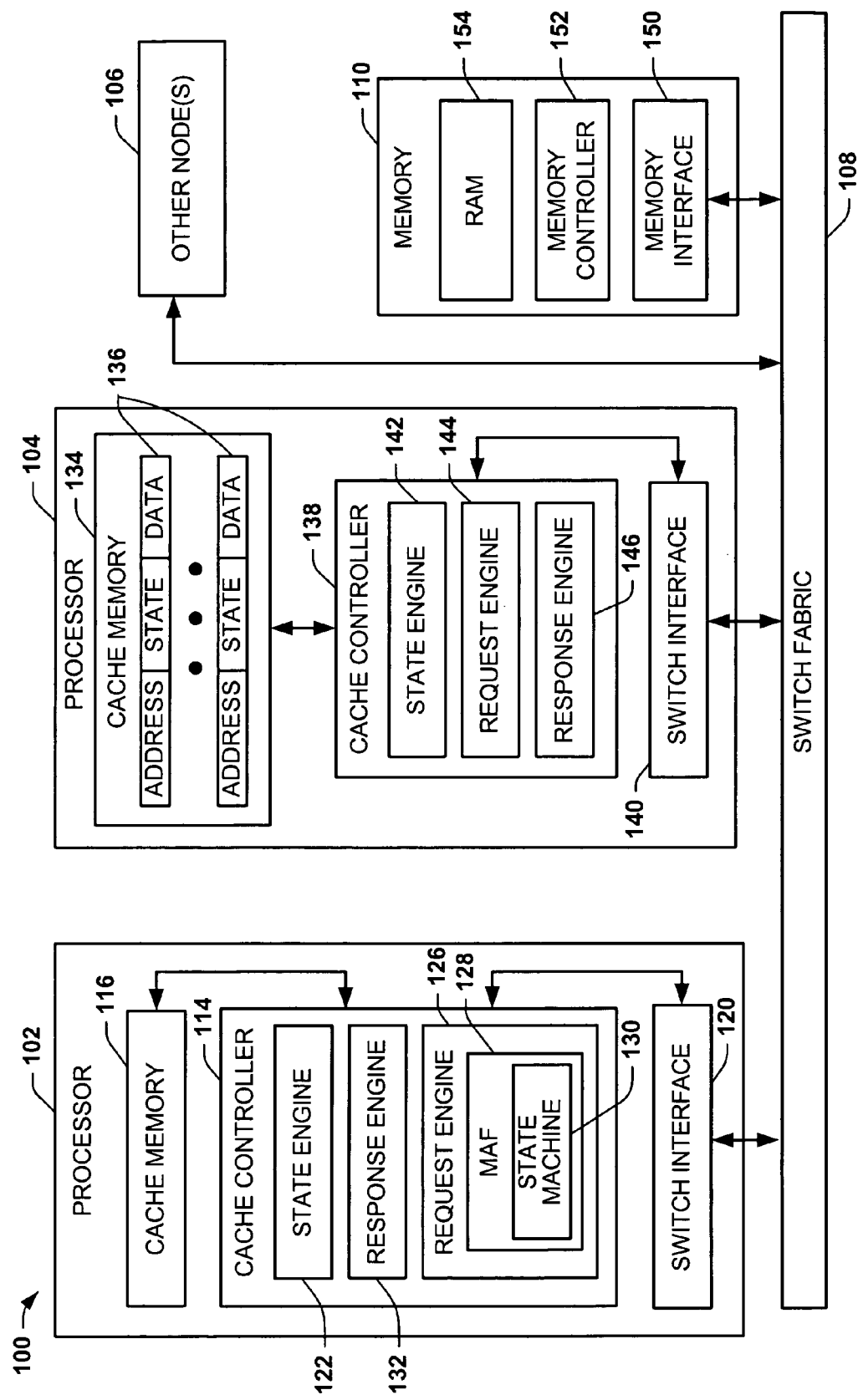
FIG. 5 depicts an example of a processor and memory within a multi-processor system.

FIG. 5 depicts an example of another multi-processor system 100 that includes a plurality of processors 102, 104 and one or more other nodes 106 in communication with each other via a switch fabric 108. The system 100 also includes associated memory 110, which can be organized as a single address space that is shared by the processors 102, 104 and the other nodes 106. For example, the memory 110 can be implemented as a plurality of separate memory modules, with a variety of module configurations for storing selected data. The system 100 can be implemented as an integrated circuit or as circuitry (e.g., one or more circuit boards) containing plural integrated circuits.

The system 100 can employ a source broadcast cache coherency protocol. In a source broadcast cache coherency protocol, a source node 102, 104 or 106 can issue a source broadcast request to all other nodes in the system and to the memory 110. In the event that conflict arises, or the source broadcast request otherwise fails, the source processor reissues the request using a forward-progress protocol, such as a null-directory or directory-based protocol.

In a null-directory-based protocol, for example, the memory 110 includes a home node for each respective cache line. Instead of issuing a broadcast to all cache targets, the source node issues a single request (or probe) to the home node for such data. The home node operates as static ordering point for requested data since all requests are sent to the home node (e.g., memory 110) for ordering before snoops are broadcast. This tends to add an additional hop for the majority of references compared with the broadcast-based protocol described above. If the system 100 employs a standard directory-based protocol, ordering is implemented at the home node, but the home node employs associated directories that facilitate locating the data (e.g., based on the directory state associated with the requested data). In a standard directory protocol, there will also be times when the directory can indicate that there are no cached copies, and thus the home node can respond with the data without issuing any snoops to the system 100. A snoop broadcast protocol can be implemented with decreased latency relative to the null-directory protocol or directory-based protocols when cache hits occur. Thus, by combining the two protocols, the system 100 operates in a more robust and efficient manner, as described herein.

Each of the respective processors 102, 104 can be implemented using the same or different processor configurations. The differences between the processors 102 and 104 depicted in the example of FIG. 5 are solely for purposes of illustrating an exemplary scenario described below. The processor 102 includes a cache controller 114 that controls and manages access to the cache memory 116, including requests for data and responses to requests from other nodes. The cache memory 116 contains a plurality of cache lines (not shown). A tag address can be associated with the data contained in the cache lines. Additionally, each cache line contains state information identifying the state of the data contained at that cache line (See, e.g., Table 1).

The cache controller 114 communicates requests and responses to the system 100 via a switch interface 120 that is coupled with the switch fabric 108. The switch interface 120, for example, includes an arrangement of queues (e.g., input and output queues) or other data structures that organize both requests and responses issued by the processor 102 as well as requests and responses for execution by the processor. The cache controller 114 cooperates with the switch interface to process transactions at the processor 102.

In the example of FIG. 5, the cache controller 114 includes a state engine 122 that controls the data stored in the cache memory 116. The state engine 122 is programmed and/or configured to implement state transitions for the cached data based on predefined rules established by the cache coherency protocol(s) implemented in the system 100. For example, the state engine 122 can modify the state of a given cache line based on requests issued by the processor 102. Additionally, the state engine 122 can modify the state of a given cache line 116 based on responses or requests provided to the processor 102 associated with the address of the given cache line. The responses or requests may be provided, for example, by another processor 104, the other nodes 106 and/or the memory 110.

Examples of state transitions that can occur in the system 100 for selected processor commands are provided in Table 2. The commands beginning with the term "broadcast" generally correspond to broadcast snoop commands implemented within the context of the source broadcast protocol. Most of the other commands (not beginning with "broadcast") are examples of typical commands that can be implemented within the context of the forward progress protocol (e.g., a null-directory-based protocol), also implemented by the system 100.

TABLE 2

| Command | Current State | | | Next State | | | Memory |
|---|---|---|---|---|---|---|---|
| | Source | Owner | Sharer | Source | Owner | Sharer | |
| Broadcast non-migratory read request | I | I | I | E or F | I | I | |
| | I | I | S | F | I | S | |
| | I | E | I | S | F | I | |
| | I | F | I | S | F | I | |
| | I | F | S | S | F | S | |
| | I | D | I | S | O | I | |
| | I | M | I | S | O | I | |
| | I | O | I | S | O | I | |
| | I | O | S | S | O | S | |
| Broadcast migratory read request | I | I | I | E | I | I | |
| | I | I | S | F | I | S | |
| | I | E | I | S | F | I | |
| | I | F | I | S | F | I | |
| | I | F | S | S | F | S | |
| | I | D | I | S | O | I | |
| | I | M | I | D | I | I | |
| | I | O | I | S | O | I | |
| | I | O | S | S | O | S | |
| Broadcast incoherent read —read current data | I | I | I | I | I | I | |
| | I | I | S | I | I | S | |
| | I | E | I | I | E | I | |
| | I | F | I | I | F | I | |
| | I | F | S | I | F | S | |
| | I | D | I | I | D | I | |
| | I | M | I | I | M | I | |
| | I | O | I | I | O | I | |
| | I | O | S | I | O | S | |
| Non-migratory read request | I | I | I | E or S | I | I | |
| | I | I | S | S | I | S | |
| | I | E | I | S | S | I | |
| | I | F | I | S | S | I | |
| | I | F | S | S | S | S | |
| | I | D | I | S | S | I | Update |
| | I | M | I | S | S | I | Update |
| | I | O | I | S | S | I | Update |
| | I | O | S | S | S | S | Update |
| Migratory read request | I | I | I | E | S | I | |
| | I | I | S | S | S | S | |
| | I | E | I | S | S | I | |
| | I | F | I | S | S | I | |
| | I | F | S | S | S | S | |
| | I | D | I | S | S | I | Update |
| | I | M | I | E | I | I | Update |
| | I | O | I | S | S | I | Update |
| | I | O | S | S | S | S | Update |
| Read-modify with no update to memory | I | I | I | E | I | I | |
| | I | I | S | E | I | I | |
| | I | E | I | E | I | I | |
| | I | F | I | E | I | I | |
| | I | F | S | E | I | I | |
| | I | D | I | D | I | I | |
| | I | M | I | D | I | I | |
| | I | O | I | D | I | I | |
| | I | O | S | D | I | I | |
| Broadcast invalidate line | F | — | I | E | I | I | |
| | F | — | S | E | I | I | |
| | O | — | I | D | I | I | |
| | O | — | S | D | I | I | |
| Read-modify with no update to memory | I | I | I | E | I | I | |
| | I | I | S | E | I | I | |
| | I | E | I | E | I | I | |
| | I | F | I | E | I | I | |
| | I | F | S | E | I | I | |
| | I | D | I | E | I | I | Update |
| | I | M | I | E | I | I | Update |
| | I | O | I | E | I | I | Update |
| | I | O | S | E | I | I | Update |
| Invalidate line | F | — | I | E | I | I | |
| | F | — | S | E | I | I | |
| | O | — | I | D | I | I | |
| | O | — | S | D | I | I | |
| | S | I | I | E | I | I | |
| | S | I | S | E | I | I | |
| | S | F | I | E | I | I | |
| | S | F | S | E | I | I | |

TABLE 2-continued

|  | Current State | | | Next State | | | |
| --- | --- | --- | --- | --- | --- | --- | --- |
| Command | Source | Owner | Sharer | Source | Owner | Sharer | Memory |
|  | S | O | I | E | I | I | Update |
|  | S | O | S | E | I | I | Update |
| Invalidate | I | I | I | E | I | I |  |
| line —no data | I | I | S | E | I | I |  |
|  | I | E | I | E | I | I |  |
|  | I | F | I | E | I | I |  |
|  | I | F | S | E | I | I |  |
|  | I | D | I | E | I | I | Update |
|  | I | M | I | E | I | I | Update |
|  | I | O | I | E | I | I | Update |
|  | I | O | S | E | I | I | Update |
|  | F | — | I | E | I | I |  |
|  | F | — | S | E | I | I |  |
|  | O | — | I | D | I | I |  |
|  | O | — | S | D | I | I |  |
|  | S | I | I | E | I | I |  |
|  | S | I | S | E | I | I |  |
|  | S | F | I | E | I | I |  |
|  | S | F | S | E | I | I |  |
|  | S | O | I | E | I | I | Update |
|  | S | O | S | E | I | I | Update |
| Read-modify | I | I | I | E | I | I |  |
| with update | I | I | S | E | I | I |  |
| to memory | I | E | I | E | I | I |  |
|  | I | F | I | E | I | I |  |
|  | I | F | S | E | I | I |  |
|  | I | D | I | E | I | I | Update |
|  | I | M | I | E | I | I | Update |
|  | I | O | I | E | I | I | Update |
|  | I | O | S | E | I | I | Update |
| Cache flush - FPP only | * | * | * | I | I | I | Update |
| Broadcast memory write back | D/M/O | — | I | I | I | I | Update |
|  | D/M/O | — | S | I | I | S | Update |
| Port memory write back | D/M/O | — | I | I | I | I | Update |

The cache controller 114 also includes a request engine 126 for managing requests sent to the system 100 by the processor 102. The request engine 126 employs a miss address file (MAF) 128 that contains MAF entries for outstanding requests associated with some subset of the lines in the cache memory 116. The request engine 126 employs the MAF 128 to manage requests issued by the processor 102 as well as responses to such requests. The MAF 128 can be implemented as a table, an array, a linked list or other data structure programmed to manage and track requests for each cache line. For example, when the processor 102 requires data associated with a given cache line, the request engine 126 allocates a corresponding entry in the MAF 128. The MAF entry includes fields that identify, for example, the address of the data being requested, the type of request, and response information (e.g., including data) received from other nodes in response to the request.

To manage responses from the system 100, each MAF entry in the MAF 128 also includes an associated state machine 130. The state machine 130 is operative manage data fills to the cache memory 116 for data responses received from the system 100. FIG. 3 provides an example of a state diagram that represents functionality associated with the state machine 130. The state machine 130 can be utilized to manage responses to requests issued by the processor 102 using a broadcast-based protocol as well as a directory-based protocol. While, for purposes of illustration, a single MAF 128 is depicted in FIG. 5, different MAF structures might be employed for the requests issued under different protocols when implemented in the system 100.

The cache controller 114 also includes a response engine 132 that controls responses provided by the processor 102 to the system 100. The response engine 132 can provide responses via the switch interface 120 to another processor 104, the other nodes 106 or the memory 110. The response engine 132, upon receiving a request from the system 100, cooperates with the state engine 122 and the MAF 126 to provide a corresponding response based on the type of request and the state of data contained in the cache memory 116. The response engine 132 also provides a blocking message to the memory (e.g., the home node) 110 in conjunction with providing a response to another processor that includes data. A response to a request can also cause the state engine 122 to effect a state transition for cached data in the cache memory 116, such as when providing an ownership data response.

The processor 104 is configured similarly to the processor 102. The processor 104 includes a cache memory 134 that includes a plurality of cache lines 136. Each of the cache lines 136 includes a tag address (ADDRESS), state information (STATE) and associated cached data (DATA). As described herein, the state information can define a cache line 136 as an ordering point for the associated data at the line. A cache controller 138 manages access to the cache lines 136 in the cache memory 134. The cache controller 138 communicates requests and responses to the system 100 via a switch interface 140 that is coupled with the switch fabric 108.

Similar to the processor 102, the processor 104 also includes a state engine 142, a request engine 144 and a response engine 146. Briefly stated, the state engine 142 implements state transitions for the cached data, such as in response to requests for cached data or responses received for requests issued by the processor 104 (See, e.g., Table 2). The request engine 144 manages requests for data issued to the system 100 by the processor 104. The request engine 144 includes a MAF (not shown) that contains entries for outstanding requests issued by the processor 104.

The response engine 146 manages requests received from the system 100. The response engine 146 cooperates with the request engine 144 and the state engine 142 to access the cache memory 134, place the requested data in a corresponding packet and transmit the data packet to the requester. For example, the response engine 146 can provide a response that includes a copy of data (e.g., S-data or D-data) when an associated cache line 136 that has a state defining that cache line as an ordering point for the data. Additionally, the response engine 146 provides a blocking message to a home node for the requested data, such as in the memory 110. The blocking message informs the home node that a cache-to-cache hit has occurred and that the home node is not required to respond with data.

The memory 110 includes an interface 150 that couples the memory to the switch fabric 108. The interface 150, for example, can include an arrangement of one or more queues (e.g., input and output queues), buffers or other data structures that organize both requests to the memory 110 and responses provided by the memory. A memory controller 152 is operative to service transactions pending in the interface 150 by accessing associated memory (e.g., random access memory (RAM)) 154. After accessing the memory 154 for requested data, the memory controller 152 returns the data to the interface 150. The interface 150 organizes the data from the memory controller in an appropriate packet and provides a corresponding response to the requester. The type of response provided by the memory 110 can vary depending on the arrival of a blocking message associated with the request.

By way of example, assume that the processor 102 requires data not contained locally in its cache memory 116. The request engine 126 creates a MAF entry in the MAF 128 for the required data. The request engine 126 implements a source broadcast snoop (e.g., a broadcast read command from Table 2) to the system 100 via the switch interface 120 and switch fabric 108. The other processor 104, the other nodes 106 and the memory 110 provide corresponding responses to the broadcast snoop.

It is assumed in the present example that when the processor 104 receives the broadcast request for the data, the processor is serving as a cache ordering point for the requested data (e.g., the cache line 136 containing the requested data is in one of the M, O, E, F or D-states). Accordingly, the response engine 146 receives the request from the switch interface 140 and accesses the data from the corresponding cache line 136 in the cache memory 134. Since the state of the data, in this example, defines the cache line 136 as a cache ordering point, the response engine 146 provides the response to the requesting processor 102 that includes a copy of the requested data. The response can include S-data or D-data, depending on the particular state of the data in the cache line 136.

As mentioned above, the memory 110 also receives the source broadcast request from the processor 102. For example, the interface 150 receives the request and queues the request as a transaction for the memory controller 152. The memory controller 152 performs a corresponding memory access to the RAM 154 for the requested data. The memory controller 152 returns the data to the interface 150, which can include an output queue in which the data is packetized for providing a corresponding response to the requesting processor 102 via the switch fabric.

The response engine 146 also sends a blocking message to the memory 110 (e.g., the home node) to indicate that the processor 104 has responded with data. As mentioned above, this type of response is referred to as a cache-to-cache hit. The blocking message is associated with the source broadcast request for the data. For example, the blocking message includes an identifier, such as can include a transaction ID associated with the source broadcast request, a tag address associated with the requested data or other information that enables the memory 110 to match the blocking message with a transaction.

When the memory 110 receives a blocking message from the processor 104, the response from the memory can vary based on whether the blocking message finds a matching transaction at the memory. In the absence of the memory 110 matching a blocking message with the request, the response will include a memory copy of the requested data (e.g., M-data). When the blocking message matches with a pending transaction, the memory 110 provides a non-data acknowledgement response (e.g., a low bandwidth response) to the requesting processor 102. No handshaking or acknowledgment of the blocking message is required to be sent back to the processor 104, and a blocking message can be discarded by the memory when it does not match a pending transaction at the memory 110.

The interface 150 and/or the memory controller 152 cooperate to ascertain whether the blocking message matches a transaction in the memory 110. The interface 150 can find a match based on a comparison between the identifier of the blocking message and corresponding tag data in the queued transaction. For example, the interface 150 can match the blocking message to the pending request when the blocking message arrives at the memory 110 while the request is in the input queue at the interface 150 waiting for the controller 152 to perform a corresponding memory access. When a match occur before performing a memory access, the memory bandwidth as well as the interconnect bandwidth can be enhanced.

A match can also occur when a blocking message arrives at the interface 150 while the memory controller 154 is performing a memory 154 access to service the corresponding snoop (e.g., a snoop phase). Even though the memory cycle may have been wasted in this situation, interconnect bandwidth can be enhanced by the interface 150 (and/or memory controller 152 dropping the memory data and by sending the non-data acknowledgement response (e.g., a low bandwidth MISS response) back to the requesting processor 102.

Usually, a match does not occur when the blocking message arrives at the memory prior to the source broadcast request from the processor 102 arriving at the home node. However, the interface 150 can also be configured to temporarily buffer or queue blocking messages (e.g., in a First In First Out (FIFO) buffer) so that a match can still occur even when the blocking message arrives prior to the source broadcast request from the processor 102.

Additionally, a match does not occur if the memory 110 provides a response to the requesting processor 102 before the blocking message arrives at the memory. There exists a possibility that the blocking message arrives at the memory, but matches up with a different request from the request that triggered the blocking message, such as a subsequent request from the same processor 102 to the same cache line. When the blocking message finds a match with the subsequent request, the memory 110 provides a corresponding non-data acknowledgment response to the requesting processor that issued the subsequent request. If a data response was provided from a cache ordering point, the requesting processor can employ the data response with generally no impact due to the blocking message. However, in a situation when no data response is received by the requesting processor, the requesting processor can employ a predetermined forward progress technique for the request. For example, the requesting processor can reissue the request using the forward-progress protocol or utilize other forward progress techniques (e.g., a retry in the broadcast protocol).

When the memory 110 provides a response that includes a copy of the requested data, two copies of the data can be sent to the requesting processor 102. The requesting processor 102 employs the state machine 130 for the associated MAF entry choose a correct and fill the cache memory 116 with an appropriate (e.g., most up-to-date) version of the requested data. In this example, the data response from the processor 104 will result in the request engine performing a data fill to the cache memory, regardless of whether M-data from the memory 110 arrives first since the response from the processor includes higher priority data (e.g., D-data or S-data). When the M-data arrives at the processor 102 after the data from the processor 104, the data state machine 130 of the request engine 126 will drop the M-data, resulting in no data fill.

The above example illustrates that the system 100 affords bandwidth optimization when a cache-to-cache hit occurs since the memory can return a lower bandwidth acknowledgement response in place of a higher bandwidth memory data response. Further, decreased memory bandwidth can exist in situations when the blocking message finds a match with a transaction at the home node before performing a corresponding memory access for the requested data. The net effects of employing the blocking message can also be considered opportunistic since they are not required to maintain forward progress for processing transactions in the system 10. For example, the state machine 130 can fill the cache memory based on an optimization layered on the broadcast-based protocol to manage multiple data responses.

In view of the foregoing structural and functional features described above, certain methods that can be implemented using a coherency protocol will be better appreciated with reference FIGS. 4–9. Each of the examples in FIGS. 4–8 illustrates various interrelationships between requests and responses and state transitions that can occur for a given memory address (e.g., memory line) in different memory devices or processor caches. In each of these examples, time flows in the direction of an arrow labeled "TIME." Those skilled in the art may appreciate various other cases that can be implemented using the coherency protocols described herein. The following methodologies can be implemented by hardware (e.g., as one or more integrated circuits or circuit boards containing a plurality of microprocessors), software (e.g., as executable instructions running on one or more processors or controllers), or any combination thereof.

Figure 6:
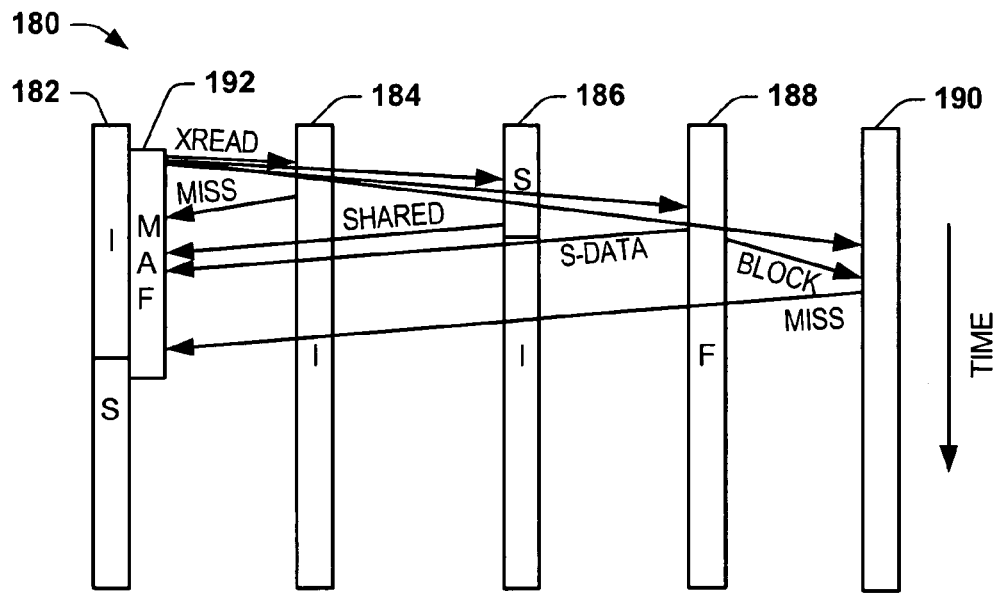
FIG. 6 depicts a first example of a network employing a blocking message.

FIG. 6 depicts an example of a network 180 that includes a source node 182, target nodes 184 and 186, an owner node 188 and a home node 190. In this example, the source node 182 requires data and thus allocates a MAF entry 192 in an associated MAF. The MAF entry 192 corresponds to a source broadcast read request (or transaction) that is broadcast to the other nodes 184, 186, 188 and 190 in the network 180. Since the node 184 is in the I-state, it provides a MISS response to the source node 182. In contrast, the node 186 provides a shared non-data response to the source node 182 since it is in the S-state when the XREAD request is received. The owner node 188 is in the F-state when the XREAD request is received, such that the state defines the node 188 as an ordering point for the requesting data. As a cache ordering point for the requested data, the node 188 provides an S-data response to the source node 182. Additionally, the owner node 188 provides a blocking message (BLOCK) to the home node 190.

In the example of FIG. 6, the BLOCK message arrives at the home node after the XREAD request, but before the home node responds to the request. As described herein, the BLOCK message includes sufficient information to enable the home node 190 to match the BLOCK message with the XREAD transaction (e.g., queued in the home node). As a result, the home node provides a non-data MISS response to the source node 182. The home node 190 can provide a MISS response to the source node 182 if the BLOCK message arrives while the corresponding XREAD request is in the queue awaiting a memory access or during a memory access for the XREAD request. In the latter situation, however, a memory access occurs. After receiving a complete set of responses from the network 180, the source node 182 can transition to the S-state, indicating that it contains a shared copy of data.

Figure 7:
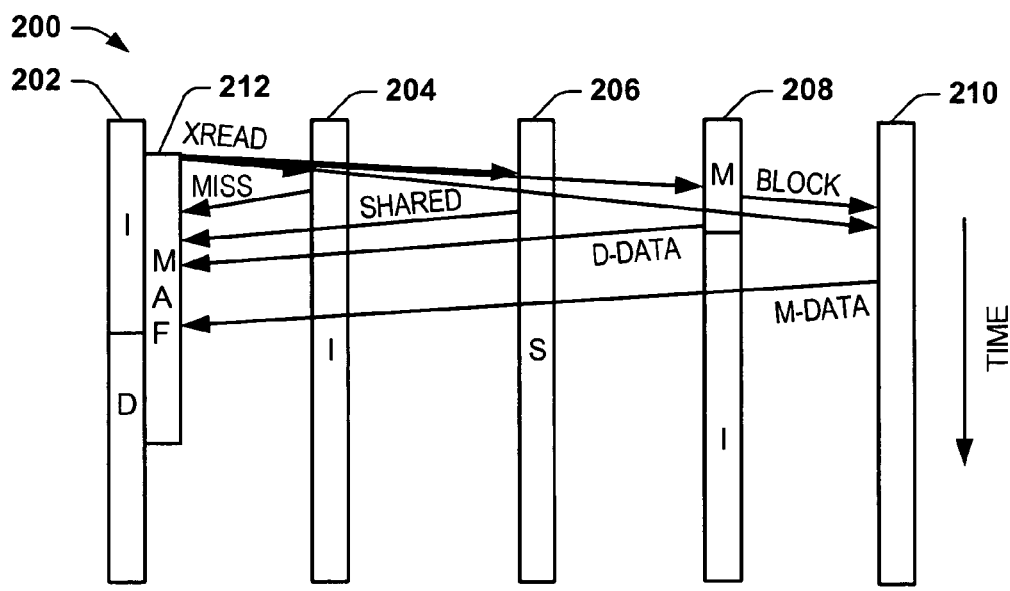
FIG. 7 depicts a second example of a network employing a blocking message.

FIG. 7 depicts an example of another network 200 that includes a source node 202, target nodes 204 and 206, an owner node 208 and a home node 210. The source node 202 and the target node 204 both start in the I-state and the node 206 starts in the S-state. The owner node 208 starts in the M-state, which state defines the owner node as a cache ordering point for the requested data. The source node 202 allocates a MAF entry 212 and issues a source broadcast XREAD request to the network 200. The node 204 responds with a MISS response and the node 206 responds with a non-data shared response. The owner node 208, being in the M-state, provides an ownership data response that includes D-data. The ownership data response, in turn, transfers the ordering point from the node 208 to the source node 202.

The owner node 208 also provides a BLOCK message to the home node 210. In this example, the BLOCK message arrives at the home node 210 prior to the XREAD request. As a result, the home node 210 can drop the BLOCK message and provide a memory data response (M-data). Alternatively, as described herein, the home node 210 can be configured to queue BLOCK messages (e.g., in a buffer structure, such as a FIFO) to facilitate matching the BLOCK message with the XREAD transaction at the home node 210 such that the home node would provide a MISS response. The owner node 208 transitions from the M-state to the I-state in response to providing the ownership data response to the source node 202. After receiving responses from all nodes in the network, the source node transitions to the D-state, which defines the node 202 as a new cache ordering point.

Figure 8:
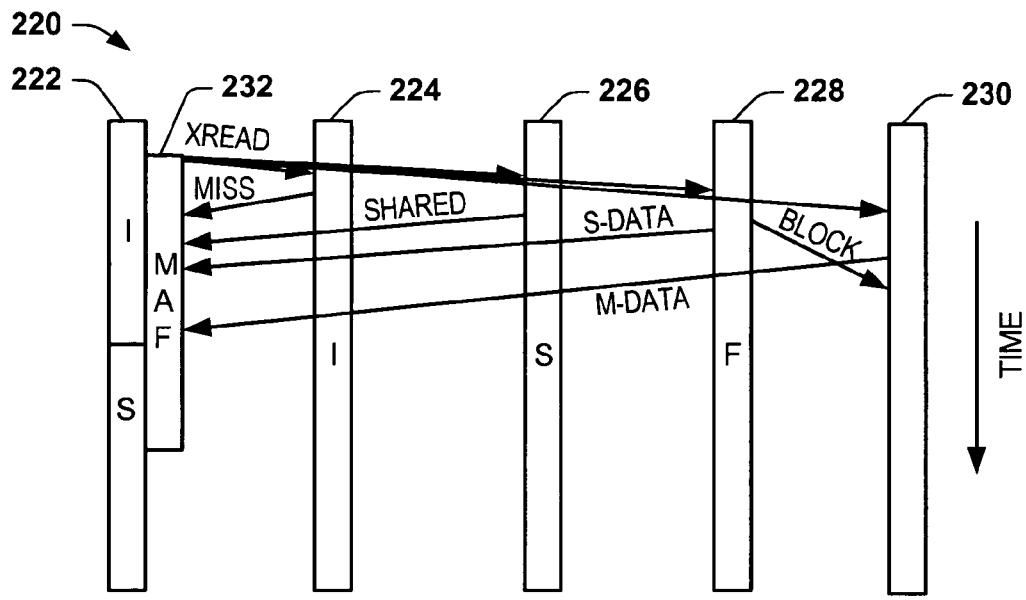
FIG. 8 depicts a third example of a network employing a blocking message.

FIG. 8 depicts an example of another network 220 that includes a source node 222, target nodes 224 and 226, an owner node 228 and a home node 230. The source node 222 allocates a MAF entry 232 corresponding to desired data required at the node. The node 222 issues a source broadcast XREAD request to the other nodes 224, 226, 228 and 230 in the network 220. Each of the nodes 224 and 226 provides an MISS response, indicating that neither of such nodes contains a valid copy of the requested data. The owner node 228 responds with a shared data response (S-data) to the source node 222. The owner node 228 also provides a BLOCK message to the home node 230. In this example, however, the BLOCK message arrives at the home node 230 after the home node has responded with M-data to the XREAD request. Since the BLOCK message arrives after the home node 230 provides the M-data response, the home node 230 takes no action with respect to the BLOCK message (e.g., the home node drops the message). The source node 222 receives both S-data and M-data. A data state machine associated with the MAF entry 232 fills the higher priority S-data in the cache of the source node 222. The source node then transitions to the S-state.

Figure 9:
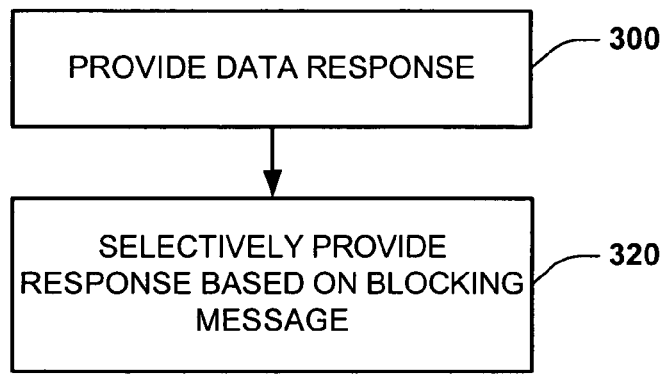
FIG. 9 depicts a flow diagram illustrating a method.

FIG. 9 depicts a method that includes providing a data response from an owner processor node to a source broadcast request for requested data, as shown at 300. The method also includes selectively providing one of a non-data response and a data response from a home node to the source broadcast request based on a blocking message being matched with a transaction associated with the source broadcast request at the home node, as shown at 310.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system comprising:
    a target node that, in response to a source broadcast request for requested data, provides a response that includes a copy of the requested data, the target node also providing a blocking message to a home node associated with the requested data, the blocking message being operative cause the home node to provide a non-data response to the source broadcast request if the blocking message is matched with the source broadcast request at the home node.

2. The system of claim 1, wherein the home node provides a response to the source broadcast request comprising one of a data response that includes a copy of the requested data and the non-data response; the response to the source broadcast request provided by the home node varying based on the home node matching any blocking message with the source broadcast request.

3. The system of claim 2, wherein the home node provides the data response if the blocking message from the target node arrives at the home node one of (i) before the source broadcast request arrives at the home node or (ii) after the home node provides the data response.

4. The system of claim 3, further comprising a source node that provides the source broadcast request for the requested data to the system, the source node including a cache, the source node filling the cache with an up-to-date copy of the requested data based on responses received by the source node from the target node and the home node.

5. The system of claim 1, wherein the blocking message from the target node further comprises an identifier associated with the source broadcast request.

6. The system of claim 5, wherein the identifier further comprises a transaction identifier that enables the home node to match the blocking message from the target node with the source broadcast request received by the home node.

7. The system of claim 1, wherein the home node provides the non-data response if the blocking message matches a transaction for the source broadcast request that is queued at the home node prior to implementing a memory access for the requested data.

8. The system of claim 1, wherein the home node provides the non-data response if the blocking message matches a transaction for the source broadcast request during memory access being performed for the transaction at the home node.

9. The system of claim 8, wherein the home node performs the memory access to obtain a copy of the requested data from memory, the home node dropping the copy of requested data obtained from the memory in response to the blocking message being matched with the transaction and the home node providing the non-data response.

10. The system of claim 1, wherein the target node further comprises a processor that includes an associated cache having a plurality of cache lines, one of the plurality of cache lines including the requested data and having a state that defines the one of the cache lines as a cache ordering point for the requested data.

11. The system of claim 9, wherein the target processor provides the response that includes the copy of the requested data as one of a shared data response and an ownership data response.

12. A computer system, comprising:
    a source processor that issues a source broadcast request for data; and
    an owner processor having an associated cache that includes the data in a given cache line, the owner processor providing a response to the source processor that includes the data, the owner processor also providing a blocking message to a home node associated with the data; and
    the home node providing a memory data response to the source broadcast request if no blocking message is matched with a transaction for the data at the home node, and the home node providing a non-data response to the source broadcast request if the blocking message is matched with the transaction for the data at the home node.

13. The system of claim 12, wherein the blocking message from the owner processor further comprises an identifier associated with the source broadcast request.

14. The system of claim 13, wherein the identifier further comprises a transaction identifier that enables the home node to match the blocking message from the owner processor with the transaction for the data.

15. The system of claim 12, wherein the home node provides the non-data response if the blocking message matches the transaction for the source broadcast request that is queued at the home node prior to implementing a memory access.

16. The system of claim 15, wherein the home node provides the non-data response if the blocking message matches the transaction for the source broadcast request during memory access being performed for the transaction at the home node.

17. The system of claim 16, wherein the home node performs the memory access to obtain a copy of the data from memory, the home node dropping the copy of data obtained from the memory in response to the blocking message being matched with the transaction and providing the non-data response.

18. The system of claim 12, wherein the home node provides the data response if the blocking message arrives at the home node one of (i) before the source broadcast request arrives at the home node or (ii) after the home node provides the data response, the home node discarding the blocking message if the blocking message is not matched with the transaction for the data at the home node.

19. The system of claim 12, wherein the source processor further comprises a cache, the source processor filling the cache with an up-to-date copy of the data based on responses received by the source processor from the target processor and the home node.

20. The system of claim 19, wherein the system employs a source broadcast protocol that defines rules for processing the source broadcast request issued by the source processor and the responses provided by the target processor and the home node, the source processor retrying the request if the source processor fails to receive a response that includes a copy of the data.

21. The system of claim 20, wherein the source processor retries the request employing a forward progress protocol comprising one of a directory-based protocol and a null-directory protocol.

22. A multiprocessor system, comprising:
means for providing a response from cache of a first processor to a source broadcast request, the response including a copy of data requested in the source broadcast request; and
means for issuing a blocking message to a home node that enables the home node to provide a non-data response to the source broadcast request in place of a corresponding data response.

23. The system of claim 22, further comprising means for matching a transaction associated with the source broadcast request at the home node with the blocking message.

24. The system of claim 23, wherein the home node provides the corresponding data response when no blocking message matches with the transaction at the home node, the corresponding data response comprising a memory copy of the data identified in the source broadcast request.

25. The system of claim 22, further comprising means for defining the cache of the first processor as a cache ordering point for the data identified in the source broadcast request.

26. The system of claim 25, wherein the response from the cache of the first processor comprising one of a shared data response and an ownership data response based on the means for defining the cache of the first processor.

27. The system of claim 22, further comprising:
means for performing a memory access at the home node to obtain a copy of the data identified in the source broadcast request;
means for dropping data obtained from the memory access at the home node in response to the blocking message being matched with a transaction associated with the source broadcast request, such that the home node provides the non-data response.

28. A method comprising:
providing a data response from an owner processor node to a source broadcast request for requested data; and
selectively providing one of a non-data response and a data response from a home node to the source broadcast request based on whether a blocking message is matched with a transaction associated with the source broadcast request at the home node.

29. The method of claim 28, further comprising:
matching the blocking message with the transaction associated with the source broadcast request at the home node; and
providing the non-data response from the home node in response to the matching of the blocking message with the transaction associated with the source broadcast request at the home node.

30. The method of claim 29, wherein the matching further comprises matching the blocking message with the transaction associated with the source broadcast request at the home node prior to implementing a memory access for the requested data.

31. The method of claim 29, further comprising performing a memory access at the home node for a memory copy of the requested data, the matching further comprises matching the blocking message with the transaction associated with the source broadcast request during performance of the memory access at the home node.

32. The method of claim 31, further comprising dropping the memory copy of the requested data in response to the blocking message matching with the transaction associated with the source broadcast request and providing the non-data response from the home node.

33. The method of claim 28, further comprising:
broadcasting the source broadcast request from a source processor node; and
wherein the owner processor node includes a cache that contains a cached copy of the requested data in a state that defines the owner processor node as a cache ordering point for the requested data, the data response provided from the owner processor further comprising one of a shared data response and an ownership data response depending on the state of the state of the cached copy of the requested data.

34. The method of claim 28, further comprising discarding the blocking message at the home node if the blocking message does not match with any transaction pending at the home node.

* * * * *

UNITED STATES PATENT AND TRADEMARK OFFICE
CERTIFICATE OF CORRECTION

| | | |
|---|---|---|
| PATENT NO. | : 7,149,852 B2 | Page 1 of 1 |
| APPLICATION NO. | : 10/761034 | |
| DATED | : December 12, 2006 | |
| INVENTOR(S) | : Stephen R. Van Doren et al. | |

It is certified that error appears in the above-identified patent and that said Letters Patent is hereby corrected as shown below:

On the Title Page, in field (73), in "Assignee", in column 1, line 1, delete "Hewlett Packard" and insert -- Hewlett-Packard --, therefor.

Signed and Sealed this

Twenty-third Day of December, 2008

JON W. DUDAS
*Director of the United States Patent and Trademark Office*